United States Patent Office 3,156,662
Patented Nov. 10, 1964

3,156,662
TETRALIN DERIVATIVE PLASTICIZERS FOR VINYL CHLORIDE POLYMERS
Daniel A. Dimmig, Wilkinsburg, Pa., and John J. Jaruzelski, Roselle, N.J., assignors to United States Steel Corporation, a corporation of New Jersey
No Drawing. Filed Mar. 10, 1961, Ser. No. 94,697
4 Claims. (Cl. 260—31.2)

This invention relates to novel tetralin derivatives which have good properties as resin plasticizers.

The object of our invention is to provide tetralin derivatives (tetralin is a synonym for 1,2,3,4-tetrahydronaphthalene) which, when used as plasticizers, impart superior characteristics to the resin, particularly superior tensile strength, modulus, elongation, tear resistance and low-temperature flexibility. Our novel compounds are tetralin derivatives having the structural formula:

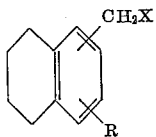

where R may be H or $CH_3$, X may be

—$OOC(CH_2)_{6-8}CH_3$ or —$OR_1OOCR_2$ in which $R_1$ is —$C_2H_4$— or —$CH_2CH_2OCH_2CH_2$— and $R_2$ is a phenyl radical. These compounds may be made readily by the reaction of tetralin with formaldehyde and hydrochloric acid to form 5- and 6-(chloromethyl)-tetralins, which react with commercially available glycols and aliphatic or aromatic acids. They serve admirably as plasticizers as will be shown hereinafter.

A complete understanding of the invention may be obtained from the following typical examples of process showing how the compounds are made and used.

Example 1

One mole of an isomeric mixture of 5- and 6-(chloromethyl)-tetralins [such a mixture may be prepared from tetralin by well-known chloromethylation procedures according to J. Am. Chem. Soc. 65, 2393–5 (1943)] containing two ml. of pyridine was added slowly to 1.1 moles of sodium pelargonate dissolved in 350 ml. of hot dimethylformamide, the mixture being stirred for an additional five hours at 140° C. The resulting mixture was cooled and filtered to remove the sodium chloride. Distillation at reduced pressure gave an 89 percent yield of the desired 5- and 6-(pelargonoxymethyl)-tetralins boiling in the range of 184° to 192° C. at 1.7 mm. of mercury absolute pressure, with a refractive index, $n_D^{25}$, of 1.5076 and a saponification number: calculated, 185.5; found, 187.3.

Example 2

One mole of sodium hydroxide was dissolved in four moles of diethylene glycol at 130° C. One mole of an isomeric mixture of 5- and 6-(chloromethyl)-tetralins was added to the hot solution and the mixture was stirred for six hours at 130° to 140° C. The resulting mixture was cooled and filtered to remove the sodium chloride. Distillation at reduced pressure gave the intermediate product, 5- and 6-(7-hydroxy-2,5-dioxaheptyl)-tetralins, in an 81 percent yield. The material had a boiling range of 170° to 179° C. at 0.8 mm. of mercury absolute pressure and a refractive index, $n_D^{25}$, of 1.5337. To a stirred mixture of 200 g. of said intermediate product, 69 g. of pyridine, and 300 ml. of carbon tetrachloride was added 119 g. of benzoyl chloride over a 30-minute period. The mixture was stirred for one hour at reflux temperature. The product mixture was diluted with water and the oil phase separated and washed with aqueous sodium carbonate and water. Distillation of the washed oil at reduced pressure gave the desired 5- and 6-(7-benzoyloxy-2,5-dioxaheptyl)-tetralins boiling at 249° to 254° C. at 1.7 mm. in a 79 percent yield. The product was identified by the following quantitative analyses:

Calculated for $C_{22}H_{26}O_4$: C, 74.6; H, 7.40. Found: C, 74.50; H, 7.46.

Saponification Number: Calculated, 158. Found: 159.1.

These new tetralin derivatives can be incorporated as plasticizers in resins in amounts from 42 to 85 parts per 100 parts of resin, but the preferred concentration is in the range of 55 to 70 parts per 100 parts of resin, all parts by weight. Several resins, such as polyvinyl chloride polymers and vinyl chloride-vinyl acetate copolymers are compatible with these new plasticizers, but the preferred resin is polyvinyl chloride.

The 5- and 6-(pelargonoxymethyl)-tetralins (PMT) and 5- and 6-(7-benzoyloxy-2,5-dioxaheptyl)-tetralins (BDT), were compounded with polyvinyl chloride resin according to the following recipe:

| | Parts |
|---|---|
| Polyvinyl chloride resin (Geon 121) [1] | 59 |
| Plasticizer | 39 |
| Stabilizer (Thermolite 31) [2] | 2 |

[1] "Geon 121" is a trademark for a commercially available polyvinyl-chloride resin.
[2] "Thermolite 31" is a trademark for a commercially available dibutyltin mercapto acetate used as a stabilizer for polyvinyl-chloride resins.

The components were mixed using a high-shear mixer to produce free-flowing plastisols. The plastisols were flowed into pans and cured at 350° F. The cured sheets were pressure molded in a four-place ASTM rubber mold at 300° F. Table I gives the physical properties of the elastomers prepared with the novel plasticizers. For comparison, the properties of an elastomer prepared with a conventional plasticizer, dioctyl phthalate (DOP), are also given.

TABLE I

| Plasticizer | PMT | BDT | DOP |
|---|---|---|---|
| Tensile Strength, p.s.i. | 2,698 | 2,491 | 1,873 |
| Elongation, percent | 590 | 495 | 486 |
| Modulus at 100% Elongation, p.s.i. | 758 | 905 | 702 |
| Thermal Stability, g./inch²/hr. at 350° F. | 0.0136 | 0.0361 | 0.0270 |
| Tear Resistance, lb./inch | 269 | 228 | 211 |
| Shore Hardness | 83 | 82 | 78 |
| Low-Temperature [1] Flexibility, Point, °C. | −40 | −80 | −50 |

[1] A test specimen was placed in acetone-Dry Ice mixture for 3 minutes at the indicated temperature, removed and immediately bent in half. The temperature at which a specimen failed was recorded as the low-temperature flexibility point.

A comparison of the properties of the elastomers obtained using the new tetralin derivative plasticizers with those obtained using dioctyl phthalate under the same conditions shows the superiority of the new plasticizers. The tensile strength, modulus, elongation and tear resistance show a considerable increase over the commercial type elastomers.

It will be evident from the foregoing that our invention provides novel compounds which are resin plasticizers superior to those now in use.

Although we have disclosed herein the preferred practice of our invention, we intend to cover as well any change or modification therein which may be made without departing from the spirit and scope of the invention.

We claim:

1. A compound of the formula:

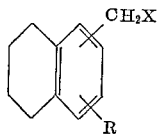

where R is selected from the group consisting of H and $CH_3$, X is $-OR_1OOCR_2$, where $R_1$ is selected from the group consisting of $-C_2H_4-$ and

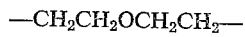

$$-CH_2CH_2OCH_2CH_2-$$

and $R_2$ is a phenyl radical.

2. A mixture of 5- and 6-(7-benzoyloxy-2,5-dioxaheptyl)-tetralins.

3. A new composition of matter comprising a resin selected from the group consisting of polyvinyl chloride polymers and vinyl chloride-vinylacetate copolymers and from 42 to 85 parts per 100 parts resin of a compound of the formula:

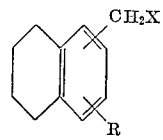

where R is selected from the group consisting of H and $CH_3$, X is $-OR_1OOCR_2$, where $R_1$ is selected from the group consisting of $-C_2H_4-$ and $$-CH_2CH_2OCH_2CH_2-$$

and $R_2$ is a phenyl radical.

4. A mixture of 5- and 6-(4-benzoyloxy-2-oxabutyl)-tetralins.

References Cited in the file of this patent
UNITED STATES PATENTS
2,198,970     Muller _____ Apr. 30, 1940

OTHER REFERENCES

Newman et al.: "J. Am. Chem. Soc." 74, pp. 905–8, 1952.